(12) United States Patent
Michelogiannakis et al.

(10) Patent No.: US 10,318,444 B2
(45) Date of Patent: Jun. 11, 2019

(54) COLLECTIVE MEMORY TRANSFER DEVICES AND METHODS FOR MULTIPLE-CORE PROCESSORS

(71) Applicants: Georgios Michelogiannakis, Berkeley, CA (US); John Shalf, Oakland, CA (US)

(72) Inventors: Georgios Michelogiannakis, Berkeley, CA (US); John Shalf, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 606 days.

(21) Appl. No.: 14/250,085

(22) Filed: Apr. 10, 2014

(65) Prior Publication Data

US 2014/0310495 A1 Oct. 16, 2014

Related U.S. Application Data

(60) Provisional application No. 61/810,853, filed on Apr. 11, 2013.

(51) Int. Cl.
*G06F 12/00* (2006.01)
*G06F 13/16* (2006.01)
*G06F 12/02* (2006.01)

(52) U.S. Cl.
CPC ...... *G06F 13/1626* (2013.01); *G06F 12/0223* (2013.01); *G06F 13/1652* (2013.01); *Y02D 10/13* (2018.01); *Y02D 10/14* (2018.01)

(58) Field of Classification Search
None
See application file for complete search history.

(56) References Cited

U.S. PATENT DOCUMENTS

| 2009/0006718 A1* | 1/2009 | Blumrich | G06F 12/0804 711/103 |
| 2009/0172264 A1* | 7/2009 | Chung | G06F 3/061 711/103 |
| 2011/0099341 A1* | 4/2011 | Resnick | G06F 9/3004 711/155 |

OTHER PUBLICATIONS

Guo, J et al., "Writing Productive Stencil Codes with Overlapped Tiling", Journal on Concurrency and Computation: Practice and Experience, vol. 21, No. 1, 2009, pp. 25-39.

(Continued)

*Primary Examiner* — Reginald G Bragdon
*Assistant Examiner* — Michael L Westbrook
(74) *Attorney, Agent, or Firm* — Kwan & Olynick LLP

(57) ABSTRACT

This disclosure provides systems, methods, and apparatus for collective memory transfers. A control unit may be configured to coordinate a transfer of data between a memory and processor cores. For a read data transfer operation, the control unit may receive a trigger packet identifying a read data transfer operation and identifying a first plurality of data lines based on data values included in the trigger packet. The control unit may read the first plurality of data lines from the memory sequentially and send a second plurality of data lines to the processor cores. For a write data transfer operation, the control unit may send a request for at least one data line to a plurality of processor cores, may receive and reorder the requested data lines, and may write the data lines to a memory. The control unit may determine a mapping between processor cores and the memory.

20 Claims, 8 Drawing Sheets

(56) References Cited

OTHER PUBLICATIONS

Holewinski, Justin et al., "High-Performance Code Generation for Stencil Computations on GPU Architectures", ICS, 2012, 10 pgs.
Kandemir, Mahmut et al., "Adaptive Prefetching for Shared Cache Based Chip Multiprocessors", DATE conference '09, 2009, pp. 773-778.
Michelogiannakis, George et al., "Collective Memory Transfers for Multi-Core Chips", ICS '14 Proceedings of the 28th ACM international conference on Supercomputing, Jun. 2014, 10 pgs.
Michelogiannakis, George et al., "Collective Memory Transfers for Multi-Core Chips", Retrieved from the Internet: <https://isswprod.lbl.gov/library/view-docs/public/output/rpt83043.PDF>, Nov. 13, 2013, 12 pgs.
Mutlu, Onur et al., "Parallelism-Aware Batch Scheduling: Enhancing both Performance and Fairness of Shared Dram Systems", 2008, 12 pgs.
Peng, Liu et al., "High-Order Stencil Computations on Multicore Clusters", IPDPS, 2009, 11 pgs.
Rixner, Scott et al., "Memory Access Scheduling", ISCA, 2000, 11 pgs.
Yuan, G L. et al., "Complexity Effective Memory Access Scheduling for Many-Core Accelerator Architectures", MICRO, 2009, 11 pgs.
Zhou, Xing et al., "Hierarchical Overlapped Tiling", CGO, 2012, 12 pgs.

\* cited by examiner

COLLECTIVE MEMORY TRANSFER DEVICES AND METHODS FOR MULTIPLE-CORE PROCESSORS

CROSS-REFERENCE TO RELATED APPLICATIONS

This application claims the benefit under 35 U.S.C. § 119(e) of U.S. Provisional Patent Application No. 61/810,853, filed on 2013 Apr. 11, which is incorporated herein by reference in its entirety for all purposes.

STATEMENT OF GOVERNMENT SUPPORT

This invention was made with government support under Contract No. DE-AC02-05CH11231 awarded by the U.S. Department of Energy. The government has certain rights in this invention.

TECHNICAL FIELD

This disclosure relates generally to computer memory and more particularly to methods and devices for increasing memory bandwidth.

BACKGROUND

For performance and cost (e.g., energy) efficiency, some high-performance computing algorithms and applications execute on single chips of a computer or a computing system with hundreds or thousands of processing cores. Such algorithms and applications include, for example, climate modeling, fluid physics simulations, and heat transfer simulations. One characteristic of these applications is that they operate on large amounts of data. For example, some heat transfer simulations compute the temperature of atoms in a three-dimensional space every time cycle. Due to the large amounts of data these algorithms read and write, the algorithms may not make full use of the computing elements because they may be constrained by main memory bandwidth.

SUMMARY

Systems, methods, apparatus, and devices are disclosed herein for implementing collective memory transfers associated with multiple-core processors. In some embodiments, devices are disclosed herein that may include a control unit. According to various embodiments, the control unit may be configured to coordinate a transfer of data between a memory and a plurality of processor cores. The control unit may be further configured to (a) receive, from at least one of the plurality of processor cores, a trigger packet associated with a read data transfer operation. The trigger packet may include one or more data values identifying a request for the read data transfer operation. The devices may also be configured to (b) identify a first plurality of data lines associated with the read data transfer operation based on the one or more data values included in the trigger packet and (c) read the first plurality of data lines from the memory sequentially. The devices may also be configured to (d) send a second plurality of data lines to the plurality of processor cores. The second plurality of data lines may include at least some data lines of the first plurality of data lines.

In various embodiments, the one or more data values included in the trigger packet may define a mapping of a plurality of memory address ranges of the memory to the plurality of processor cores. Moreover, each memory address range of the plurality of memory address ranges may correspond to a memory tile of a plurality of memory tiles included in a tiled data array. In some embodiments, in operation (d), data lines of the second plurality of data lines may be sent to processor cores of the plurality of processor cores based on the mapping, and the mapping may associate each memory tile of the plurality of memory tiles with a processor core of the plurality of processor cores. The control unit may be configured to generate a mapping between a plurality of memory address ranges and the plurality of processor cores in response to receiving the trigger packet. Furthermore, the one or more data values included in the trigger packet may include a flag, and the control unit may be configured to initiate a learning mode in response to identifying the flag. The control unit may be further configured to store the mapping in a data layout array.

In some embodiments, the control unit may be configured to observe memory access patterns associated with the plurality of processor cores when in the learning mode. Furthermore, operations (c) and (d) occur at least in part at the same time. Moreover, the control unit may be configured to perform operation (c) in response to all of the processor cores of the plurality of processor cores being ready to receive data. In some embodiments, the control unit may be configured to perform operation (c) in response to at least one of the processor cores of the plurality of processor cores being ready to receive data. According to some embodiments, the memory may be a storage device selected from the group consisting of: a random access memory, a direct random access memory, and a non-volatile random-access memory.

Also disclosed herein are devices that may include a control unit that may be configured to coordinate a transfer of data between a memory and a plurality of processor cores. In some embodiments, the control unit may be configured to (a) receive, from at least one of the plurality of processor cores, a trigger packet associated with a write data transfer operation. The trigger packet may include one or more data values identifying a request for the write data transfer operation. The control unit may be further configured to (b) send a request for at least one data line to each processor core of the plurality of processor cores and (c) receive, from at least one of the processor cores, a plurality of data lines. The plurality of data lines may include at least a portion of the requested at least one data line. The control unit may be further configured to (d) reorder the plurality of data lines sequentially based on one or more memory addresses associated with each data line of the plurality of data lines to generate a reordered plurality of data lines. The control unit may be further configured to (e) write the reordered plurality of data lines to the memory.

In some embodiments, the one or more data values included in the trigger packet may define a mapping of a plurality of memory address ranges of the memory to the plurality of processor cores. According to various embodiments, each memory address range of the plurality of memory address ranges may correspond to a memory tile of a plurality of memory tiles included in a tiled data array. The mapping may associate each memory tile of the plurality of memory tiles with a processor core of the plurality of processor cores. Moreover, in operation (e), data lines of the reordered plurality of data lines may be written to the memory based on the mapping between the plurality of memory tiles and the plurality of processor cores. In some embodiments, the control unit may be configured to generate a mapping between a plurality of memory address ranges and the plurality of processor cores in response to receiving the trigger packet. Furthermore, the trigger packet may include one or more data values indicating that at least one processor core of the plurality of processor cores is ready to write data. In some embodiments, the devices may further include a reorder buffer configured to perform operation (d). Moreover, in operation (c), data lines of the plurality of data lines may be received in a random order.

Also disclosed herein are systems that may include a memory configured to store one or more data values included in a data array and a memory controller configured to manage reading and writing data to and from the memory. The systems may further include a plurality of processor cores configured to perform one or more processing operations on at least some of the one or more data values stored in the memory. The plurality of processor cores may be configured to issue read data transfer requests to read at least some of the data values stored in the memory. The plurality of processor cores may be further configured to issue write data transfer requests to write to the memory. The systems may also include a control unit configured to coordinate the read data transfer requests sent from the plurality of processor cores to the memory. The control unit may be further configured to coordinate the write data transfer requests sent from the plurality of processor cores to the memory. In some embodiments, the control unit may be integrated with the memory controller.

Details of one or more embodiments of the subject matter described in this specification are set forth in the accompanying drawings and the description below. Other features, aspects, and advantages will become apparent from the description, the drawings, and the claims.

DETAILED DESCRIPTION

Introduction

Figure 1:
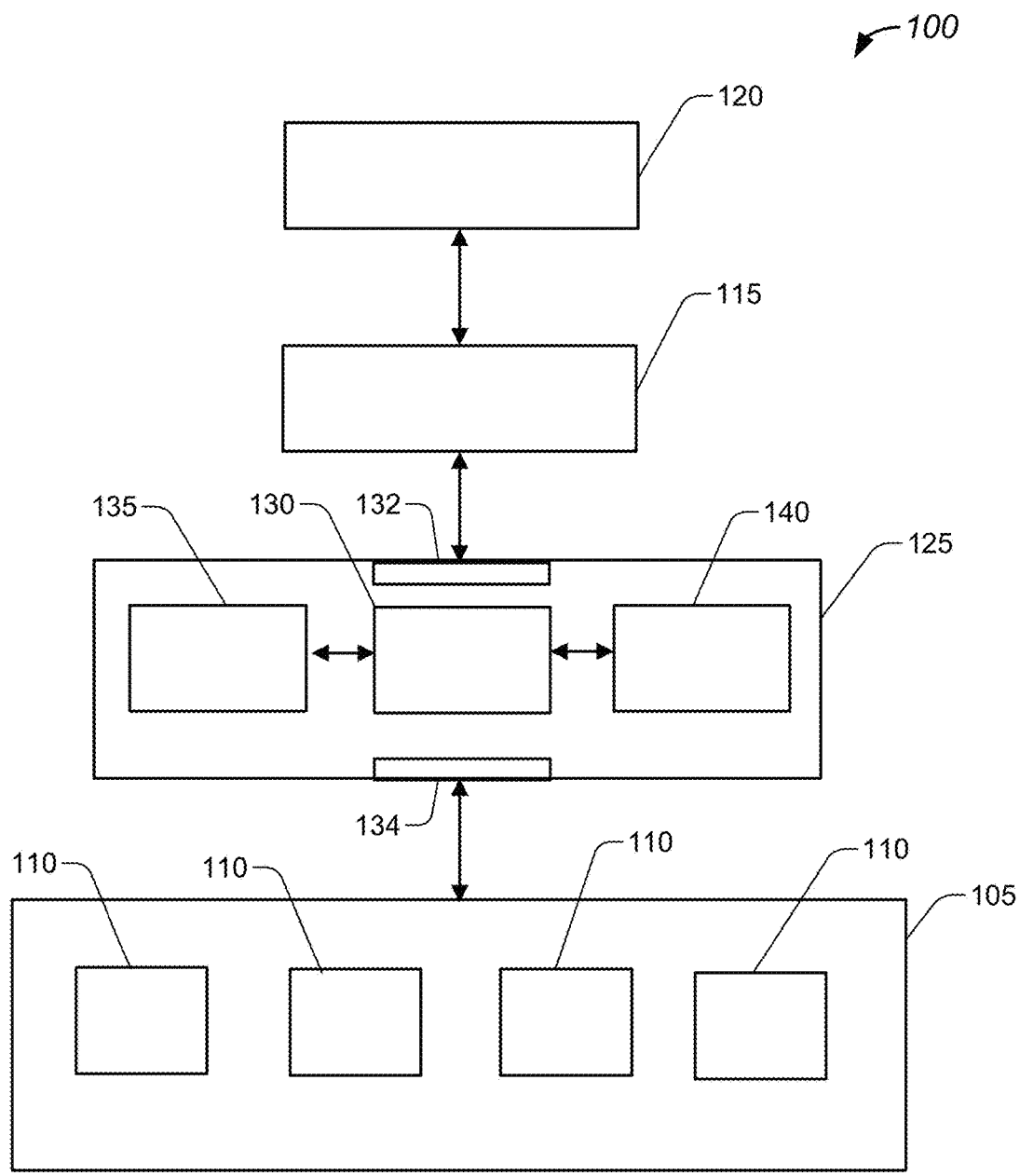
FIG. 1 illustrates an example of a system including a collective memory scheduling (CMS) engine, implemented in accordance with some embodiments.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Main memory technology for a computer or a computing system may underperform when the main memory receives requests for data that are not in address order. For example, a main memory can provide higher throughput for a read sequence for addresses 1, 2, 3, 4 than for the read sequence 3, 1, 4, 2. Coordinating all processors of a multiple-core processor such that requests arrive in order may increase the main memory bandwidth and thus decrease the execution time of some algorithms. Increasing the memory bandwidth this way may have a direct and positive effect on execution time of an algorithm. In addition, the required energy for the same operation may be reduced due to issues related to main memory when it is subjected to in and out of order access requests, such as row activation and associated overfetch penalties.

Some attempts have been made to implement software optimizations to resolve these issues. For example, previous attempts may load more data at each iteration and perform redundant operations in exchange for reduced memory accesses. Other optimizations have attempted to order requests while they are in-flight to the memory controller by making local decisions at various locations on the way. None of these techniques, however, have been able to achieve a proper address order.

Embodiments disclosed herein relate to a device or a hardware control unit, which is referred to as a collective memory scheduling (CMS) engine, and methods of use thereof. In some embodiments, a CMS engine may be disposed between a multiple-core processor and a memory or a memory controller associated with the memory. The CMS engine may manage, control, and coordinate communications and data transfers between the memory and the processor cores of the multiple-core processor.

For example, data representing a three dimensional (3D) space can reside in a main memory for heat transfer simulations. Each processor may be assigned a tile (e.g., a chunk) of the 3D space on which to perform local computations. Thus, the data may be represented in a distributed data array and may be compartmentalized into different memory tiles, where each tile is assigned to or associated with a different processor or processor core and may be approximately the size of the processor core's cache. Processors may receive a new tile at every iteration loop of the local computations. Conventional techniques require that each processor send requests for a tile independently. However, according to embodiments disclosed herein, the CMS engine can control interactions between the main memory and the processors to create a collective memory transfer in which the data transfer between the memory and the processors is coordinated, the reading of the memory occurs sequentially, and data is sent to the appropriate processors. The CMS engine may similarly control write operations performed from the processor cores or processors to the main memory. The CMS engine may control the collective transfer by retrieving data from each processor in memory address order. In both cases, memory address order can be preserved to a degree that is not possible using other techniques. Simulations of CMS engines have shown an improvement gain in memory performance (e.g., data per time) of up to 39%, as well as a reduction in the energy required by memory to complete a single collective transfer by up to 2.2 times. Therefore, aspects of retrieving large amounts of data for a wide class of algorithms are improved by the devices, systems, apparatus, and methods disclosed herein.

As similarly discussed above, the data-movement activities across many processors and processor cores in single chip may be coordinated by a control unit or CMS engine. Collective memory scheduling (CMS) as well as programming constructs may be used to implement the coordination of such data-movement activities efficiently and easily. In some embodiments, distributed data arrays associated with the processors may be expressed using a hierarchically tiled array (HTA) abstraction. While various embodiments disclosed herein describe the implementation of HTA abstractions, any suitable programming abstract may be used and distributed data arrays may be implemented independent of HTA abstractions. Implementations of CMS as disclosed herein may coordinate all processors such that distributed data arrays are read from or written to memory as a unit, and distributed to the appropriate processors and processor cores. Memory access and distribution of data to and from the processors may be handled by the CMS engine, which may be a hardware engine. In some embodiments the CMS engine may replace individual prefetch or direct memory access (DMA) engines at each processor core included in the multiple-core processor. According to various embodiments, the CMS engine may preserve memory address ordering when accessing main memory to maximize memory performance and minimize power consumption, as well as eliminate network congestion.

In various embodiments, a programming interface may be provided that implements an HTA syntax to define a two dimensional (2D) plane of data that a CMS operation may handle. According to some embodiments, existing HTA syntax may be modified to easily and compactly express ghost zones or shared data by adding a parameter to denote the number of cells in each dimension that comprise the ghost zone. As discussed in greater detail below with reference to FIG. 7, a ghost zone may refer to a region or portion of data that is present or stored in a neighboring memory tile within a distributed array. In the absence of the HTA syntax disclosed herein, programmers may need to calculate multiple address ranges for individual DMA operations for each processor or processor core. As disclosed herein, an additional parameter may be added after the parameters that denote tile boundaries. In some embodiments, the additional parameter may denote how many ghost zone cells, units, elements, or datum are present in each dimension of each neighboring tile. Furthermore, an additional parameter may be added to define a mapping between processors and units of data, such as memory tiles. An example of such a declaration is provided below:

Array=hta(name, {[1,3,5],[1,3,5]}, [3,3],
F(x)=X, // Mapping function
1); //Memory tiles share one cell in each dimension)

In this example, each memory tile has a ghost zone of one cell in each dimension. The resulting mapping is discussed in further detail below with reference to FIG. 7. In this way, various embodiments disclosed herein expand the syntax of HTAs to offer a syntax capable of declaring ghost zones of varying shapes and sizes. As discussed in greater detail below with reference to FIG. 5, according to various embodiments disclosed herein, a mapping mode may be implemented that does not utilize such additional parameters. Accordingly, the HTA declaration might not include the information defined by the previously described parameters, and the information may be learned or determined by the CMS engine instead.

In some embodiments, the extended HTA declaration may be used to initiate read and write operations. Such read and write operations may utilize CMS read or write function calls that may include data values identifying an HTA instance and its starting address in memory as parameters. Since the processor core that initiated the function call is implicit and the HTA instance contains tiling and layout information associated with the distributed data array, a CMS library included in the CMS engine may be used to determine what address ranges each processor utilizes for reading and writing, or just for reading (which may be for its ghost zones).

As will be appreciated, such a CMS-based interface, or application program interface (API), may be considerably simpler than DMA operations in local-store architectures such as the STI Cell processor, where a programmer may have to calculate address ranges individually for each processor in order to configure each processor's DMA engine. In such situations, when a processor's tile consists of non-contiguous memory addresses, a potentially large number of DMA calls may be necessary, which in turn may require large transaction queues in each DMA engine. The implementation of a CMS-based interface and a CMS engine as disclosed herein does not utilize such voluminous address calculations by the programmer. Thus, as opposed to conventional techniques which may require numerous DMA operations and associated function calls, various embodiments disclosed herein utilize a single function call. An example of a single CMS function call that may be used for a read operation in a multiple-core system which may have, for example, 64 cores is provided below:

HTA_instance=CMS_read (HTA_instance)

These and other features will be discussed in greater detail below.

Devices and Methods

FIG. 1 illustrates an example of a system including a collective memory scheduling (CMS) engine, implemented in accordance with some embodiments. As shown in FIG. 1, a system 100 may include a multiple-core processor 105, a CMS engine 125, a memory controller 115, and a main memory 120. In various embodiments, the system 100 may be implemented as part of a computer or a computing system. For example, the system 100 may be implemented within a computer system configured for environmental modeling. According to some embodiments, the CMS engine 125 may handle the scheduling of collective transfers made to or from a main memory, such as the main memory 120. Moreover, the CMS engine 125 may manage requests associated with the reading and writing of data arrays within the main memory 120. Furthermore, the CMS engine 125 may manage the pushing and pulling of data to and from different processors included in one or more multiple-core processor(s), such as multiple-core processor 105. In this way, the CMS engine 125 may replace or preempt individual processor prefetch or direct memory access (DMA) engines which may be associated with each processor within the multiple-core processor(s). By managing interactions between the processors and the main memory 120, the CMS engine 125 may increase the effective memory bandwidth of the system 100, and may increase the rate at which data can be read from or written to the main memory 120 using the multiple-core processor 105.

In some embodiments, the CMS engine 125 may be implemented for each memory controller implemented in the system 100. Thus, a system such as the system 100 may include multiple CMS engines and multiple memory controllers. According to various embodiments, the CMS engine 125 may be co-located with or integrated in each memory controller to reduce communication delay and ensure that the CMS engine 125 is not a communications bottleneck. Moreover, in some embodiments, the CMS engine 125 may be implemented atop a conventional DMA engine. The CMS engine 125 may utilize a starting address and size for each operation, but may also include an extended destination field which contains tiling and ghost zone information which ensures that data is sent to the correct respective destinations, as discussed in greater detail below. In some embodiments, the CMS engine 125 may perform one or more operations based on data included in a co-located memory partition. For example, the CMS engine 125 may serve processors 0 to 3 if its co-located memory controller includes data for those processors.

In some embodiments, the CMS engine 125 may be implemented as a separate logic block which breaks down each CMS operation into multiple traditional DMA commands. Those commands may then be enqueued into a command queue of a DMA engine. Accordingly, the CMS engine 125 may maintain legacy DMA operation compatibility for non-CMS operations.

According to various embodiments, the CMS engine 125 may include a memory interface 132 which may be communicatively coupled to memory controller 115 and a memory, such as the main memory 120. In some embodiments, the memory interface 132 may be coupled to the main memory 120 via the memory controller 115. Thus, the memory controller 115 may mediate communications between the CMS engine 125 and the main memory 120. In various embodiments, the CMS engine 125 may be directly coupled to the main memory 120 and may directly communicate with the main memory 125. Moreover, the CMS engine 125 may include a network interface 134 that may be communicatively coupled to the multiple-core processor 105 and may be configured to communicate with an on-chip network that handles communications associated with processor cores included in the multiple-core processor 105 associated with the system 100. Thus, as discussed in greater detail below with reference to FIG. 3, the on-chip network may include one or more routers that mediate communications between processor cores, such as processor cores 110, and other system components, such as the CMS engine 125.

In various embodiments, the CMS engine 125 may include a controller 130 and a reorder buffer 135. The controller 130 may include control logic as well as other hardware and software that may be configured to control the operation of the CMS engine 125. For example, the controller 130 may be implemented as a relatively simple logic device configured to control the operation of the CMS engine 125. In another example, the controller 130 may be implemented as a combination of software and hardware. In some embodiments, the controller 130 includes combinational logic (e.g., gates) that may be used to implement a data transfer operation. In various embodiments, the controller 130 further includes state elements that are operable to store information regarding a data transfer operation that is being performed. In some embodiments, the controller 130 is operable to implement a data transfer operation, as described in greater detail below with reference to FIG. 2 and FIG. 4. Furthermore, the controller 130 may include logic configured to implement one or more mapping modes used to map processor cores to memory addresses, as discussed in greater detail below with reference to FIG. 5. Thus, the operation of CMS engine 125 and its respective implementation of a mapping mode may be controlled by the logic included in controller 130. Moreover, mapping information associated with the mapping modes may be stored and managed by controller 130.

As stated above and discussed in greater detail below with reference to FIG. 4, the CMS engine 125 may include a reorder buffer 135 which may be a buffer configured to order or reorder multiple data values or requests, such as memory access or write requests. In some embodiments, the reorder buffer 135 may be a region of a physical memory storage used to temporarily store data while it is being moved between the main memory 120 and the multiple-core processor 105. According to various embodiments, the hardware of the reorder buffer 135 may be different from the hardware of the main memory 120. In particular embodiments, the reorder buffer 135 includes register cells. Moreover, the reorder buffer 135 may function as a small and fast data storage block. As described herein, the reorder buffer 135 may be any suitable type of buffer or memory device, and need not be a queue memory that adds at the end of the queue and reads from a head of the queue.

In some embodiments, the reorder buffer 135 may include a logic device that may be configured to detect addresses of incoming data lines and determine the order the data lines should be in. The reorder buffer 135 may be further configured to reorder the data lines such that the data lines are output from the reorder buffer 135 in memory address order. In some embodiments, the memory size of the reorder buffer 135 may be smaller than a memory size of a memory that the data are to be written to. For example, the reorder buffer 135 may have a size of about 2 kilobytes and the size of the memory that data are to be written to may be about 1 gigabyte or larger. In some embodiments, the reorder buffer 135 may be configured to store a subset of the data lines of a data transfer operation.

The CMS engine 125 may also include one or more memory read buffers, such as memory read buffer 140. In various embodiments, memory read buffer 140 may be a buffer or register configured to store data being transferred between the main memory 120 and the CMS engine 125. In this way, memory read buffer 140 may buffer interactions between the CMS engine 125 and the main memory 120 and ensure continuous operation between the two.

The multiple-core processor 105 may include one or more processing devices, such as one or more central processing units (CPUs), microcontrollers, field programmable gate arrays, or other types of processing devices. The multiple-core processor 105 includes a plurality of processor cores 110; i.e., it is a multi-core or a many-core processor. In some embodiments, the processor cores 110 are central processing unit (CPU) cores. In various embodiments, the processor cores 110 are simple CPU cores. Moreover, the processor cores 110 may be general purpose processor cores. In some embodiments, the multiple-core processor 105 may be a graphical processing unit (GPU), which includes a plurality of graphics processing cores.

In some embodiments, the memory controller 115 and the main memory 120 may be external to the multiple-core processor 105. In various embodiments, the memory controller 115 and the main memory 120 may be internal to the multiple-core processor 105. According to some embodiments, the main memory 120 includes an electronic data storage device which may be implemented on a semiconductor-based integrated circuit. In some embodiments, the main memory 120 is a random access memory (RAM). According to various embodiments, the main memory 120 may include a direct random access memory (DRAM). Moreover, the main memory may be a non-volatile random access memory (NVRAM). The embodiments disclosed herein may also be implemented with other memory technologies that may benefit from an ordered data transfers.

In some embodiments, each byte in the main memory 125 may be identified by a memory address. Regions of the main memory 125 may be defined by bytes that share the X (i.e., a variable) most significant bits of their address. For the purposes of some of the embodiments disclosed herein, a memory address order may be determined based on all the bits of the memory address. In some embodiments, the CMS engine 125 is operable to sequentially read every byte stored in the main memory 125. In various embodiments, the memory controller 115 may be configured to manage the transfer of data between the main memory 120 and the CMS engine 125.

As similarly discussed above, a multiple-core processor, such as the multiple-core processor 105, may be associated with or include a plurality of memory controllers. Each of the plurality of memory controllers may be coupled to a main memory (i.e., there may be a plurality of main memories). Each of the plurality of memory controllers may also be coupled to a CMS engine (i.e., there may be a plurality of CMS engines). In these embodiments, the memory address space may be divided such that a process or algorithm executing a read operation associated with a specific set of data may identify a specific memory controller associated with the set of data. Accordingly, the implemented process or algorithm may identify and communicate with that specific memory controller to obtain the specific set of data based, at least in part, on a memory address.

Figure 2:
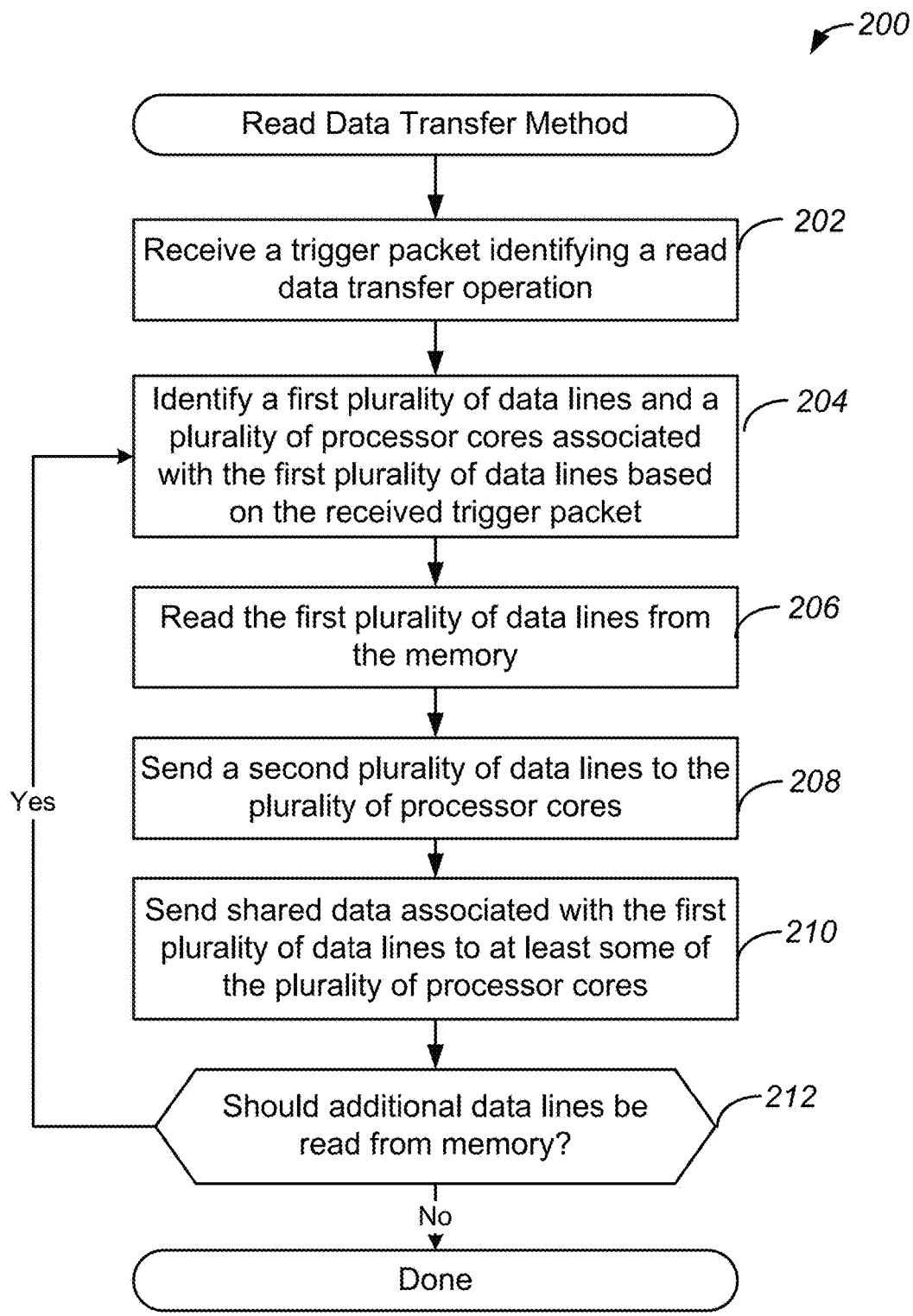
FIG. 2 shows an example of a flow diagram illustrating a method for reading data from a memory using a CMS engine in accordance with some embodiments.

FIG. 2 shows an example of a flow diagram illustrating a method for reading data from a memory using a CMS engine in accordance with some embodiments. The method 200 shown in FIG. 2 may be performed with the CMS engine 125 described above in FIG. 1. Starting at block 202 of the method 200, a trigger packet may be received. In some embodiments, the trigger packet is a data packet that may include one or more data values configured to identify a request for a read data transfer operation, or identify a ready state of the processor cores which indicates that one or more processor cores is ready for a read data transfer operation. Accordingly, receipt of the trigger packet may initiate a read data transfer operation. In various embodiments, the read data transfer operation may be managed and executed by a CMS engine, such as the CMS engine 125 described above with reference to FIG. 1. Thus, a CMS engine may be used to schedule the transfer of data from a data array stored in memory to several processor cores, and may effectively push data to the processors in a coordinated and ordered manner during the method 200.

In various embodiments, in addition to including data values that identify a request or ready status associated with a read data transfer operation, a trigger packet may be configured to include one or more data values identifying other features or characteristics of the read data transfer operation. For example, the trigger packet may include one or more data values identifying one or more data lines to be transferred from the memory to one or more processors. Furthermore, the trigger packet may include one or more data values identifying a start memory address and an end memory address of the memory for the read data transfer operation. In another example, the trigger packet may include one or more data values identifying a specific starting tile line within a memory tile. Moreover, the trigger packet may include one or more data values defining a mapping of a memory address or tile line of the memory to each processor core of the plurality of processor cores. For example, memory address 2 may correspond to processor core 2 and memory address 3 may correspond to processor core 3. This information may be used, for example, at block 208 and block 210 to identify which data lines should be sent to which processor cores. In some embodiments, the one or more data values defining the mapping may be obtained or retrieved from a software library or may be learned or determined by the CMS engine, as discussed in greater detail below with reference to FIG. 5.

As will be discussed in greater detail below with reference to FIG. 3, the read data transfer operation may be synchronous or asynchronous. Thus, during block 202, numerous trigger packets may be received from numerous different processor cores associated with the data array that is to be read from memory. In this example, the read data transfer operation may commence when trigger packets have been received from all processor cores or a representative group of the processor cores which are mapped to or are associated with the data array stored in memory. Thus, the CMS engine may be configured to implement an implicit barrier in which the read data transfer operation does not commence until trigger packets or ready signals have been received from all or a representative group of the processor cores associated with the data array that is to be read from memory. Furthermore, according to various embodiments, the read data transfer operation may be asynchronous, and the read data transfer operation may commence when a trigger packet has been received from only one or less than all of the processor cores associated with the data array stored in memory. Processor cores that have not yet sent a trigger packet may be configured to store a tile from the next iteration of the read data transfer operation in addition to the tile currently being worked on, thus enabling the processor cores to be desynchronized by at least one read data transfer operation cycle.

At block 204, a first plurality of data lines and a plurality of processor cores associated with the first plurality of data lines may be identified based on the received trigger packet. As previously discussed, the first plurality of data lines may be determined or identified based on data values included within the trigger packet. For example, the trigger packet may include a memory address, which may be a starting address, which may identify a particular location in memory where the data array is stored. Based on the identified memory address, a system component, such as the CMS engine, may parse the information from the trigger packet and may identify several data lines that are included in the data array and reside at subsequent memory addresses. Moreover, the CMS engine may identify various processor cores which are associated with each of the data lines or tiles within the memory array. Such an association between a processor core and a tile or data line may be determined based on a mapping mode, as will be discussed in greater detail below with reference to FIG. 5, FIG. 6, and FIG. 7. Mapping information, which may map processor cores to memory tiles or portions of memory tiles included in a data array, may be included in the trigger packet itself or may be stored and maintained separately by the CMS engine in a separate storage device or memory. Moreover, such mapping information may be stored in a portion of the memory that stores the data array.

At block 206, the first plurality of data lines may be read from memory. Thus, after identifying the data lines to be read, the CMS engine may sequentially read the data lines from the data array stored in memory. For example, a previously identified start memory address may be 1, and the end memory address may be 10. The data lines may be read from memory addresses of the memory in address order; i.e., address 1, address 2, address 3, address 4, address 5, address 6, address 7, address 8, address 9, and address 10. In this way, the CMS engine may implement a sequential and ordered reading of data values from the memory addresses to read the entire data array from memory. In various embodiments, reading data lines from memory sequentially and in memory address order may be faster and more efficient than random access patterns which result from independent processor core requests because the read data transfer operation provided by the CMS engine efficiently makes use of pre-activated rows in memory which may be activated in sequential or an ordered fashion, thus reducing the number of row activations, power, and time required for the entire data transfer operation.

At block 208, a second plurality of data lines may be sent to the plurality of processor cores of the multiple-core processor. In some embodiments, the second plurality of data lines includes at least some data lines of the first plurality of data lines. As previously discussed, data lines sent to a processor core may be determined based on a mapping between the data lines or tiles of the data array and each processor core of the plurality of processor cores. In some embodiments, the plurality of processor cores of the multiple-core processor may include all of the processor cores of a multiple-core processor. In some embodiments, the plurality of processor cores of the multiple-core processor may include some of or a portion of the processor cores of a multiple-core processor.

At block 210, shared data associated with the first plurality of data lines may be sent to at least some of the plurality of processor cores. Thus, according to some embodiments, the first plurality of data lines may include shared data which may be included in ghost zones associated with reader processor cores. In some embodiments, such data lines may be marked or flagged by the processor cores themselves. Accordingly, shared data may be identified by a CMS engine based on such flags, and may be multicast or duplicate unicast to any reader processors associated with the shared data. In this way, the CMS engine may manage the distribution of shared data to multiple processor cores based on a single read operation of the memory, and the CMS engine may prevent additional redundant memory access requests from each independent processor core for the shared data.

In some embodiments, all data associated with the read data transfer operation may be read and sent during blocks 204 through 210. However, as discussed in greater detail below with reference to FIG. 4, read requests may be issued by the CMS engine in groups or batches. Thus, the read request(s) issued at block 206 may be for a group or batch of data lines included in a distributed data array. Such handling of read requests may efficiently utilize system resources by ensuring that components are continually active. Thus, numerous groups or batches of requests may implemented to read an entire distributed data array and read all data associated with the read data transfer operation. Accordingly, at block 212, it may be determined whether or not additional data lines should be read from memory. If it is determined that additional data lines should be read from memory, method 200 may return to block 204 and blocks 204, 206, 208, and 210 may be repeated until all of the data lines needed for the read data transfer operation are read. If it is determined that no additional data lines should be read from memory, method 200 may terminate.

While blocks 206, 208, and 210 are shown in FIG. 2 as occurring in a sequential fashion, in some embodiments, operations at block 206 occur simultaneously with operations at block 208 and block 210. For example, a CMS engine may be reading data lines from a memory and sending data lines to a plurality of processor cores of a multiple-core processor at the same time. Stated in a different manner, in some embodiments, blocks 206, 208, and 210 may be performed simultaneously, with data lines being read from the memory and being sent to a plurality of processor cores of a multiple-core processor. For example, at block 206, data lines from memory addresses 1-3 may be read. While sending the data lines from memory addresses 1-3 to processor cores (block 208), more data lines from additional memory addresses (e.g., memory addresses 4-6) may be read from the memory. In some embodiments, operations at block 206 may be performed continuously or almost continuously during the method 200. In some embodiments, operations at block 206 are completed when all of the data lines from the start memory address to the end memory address have been read.

Figure 3:
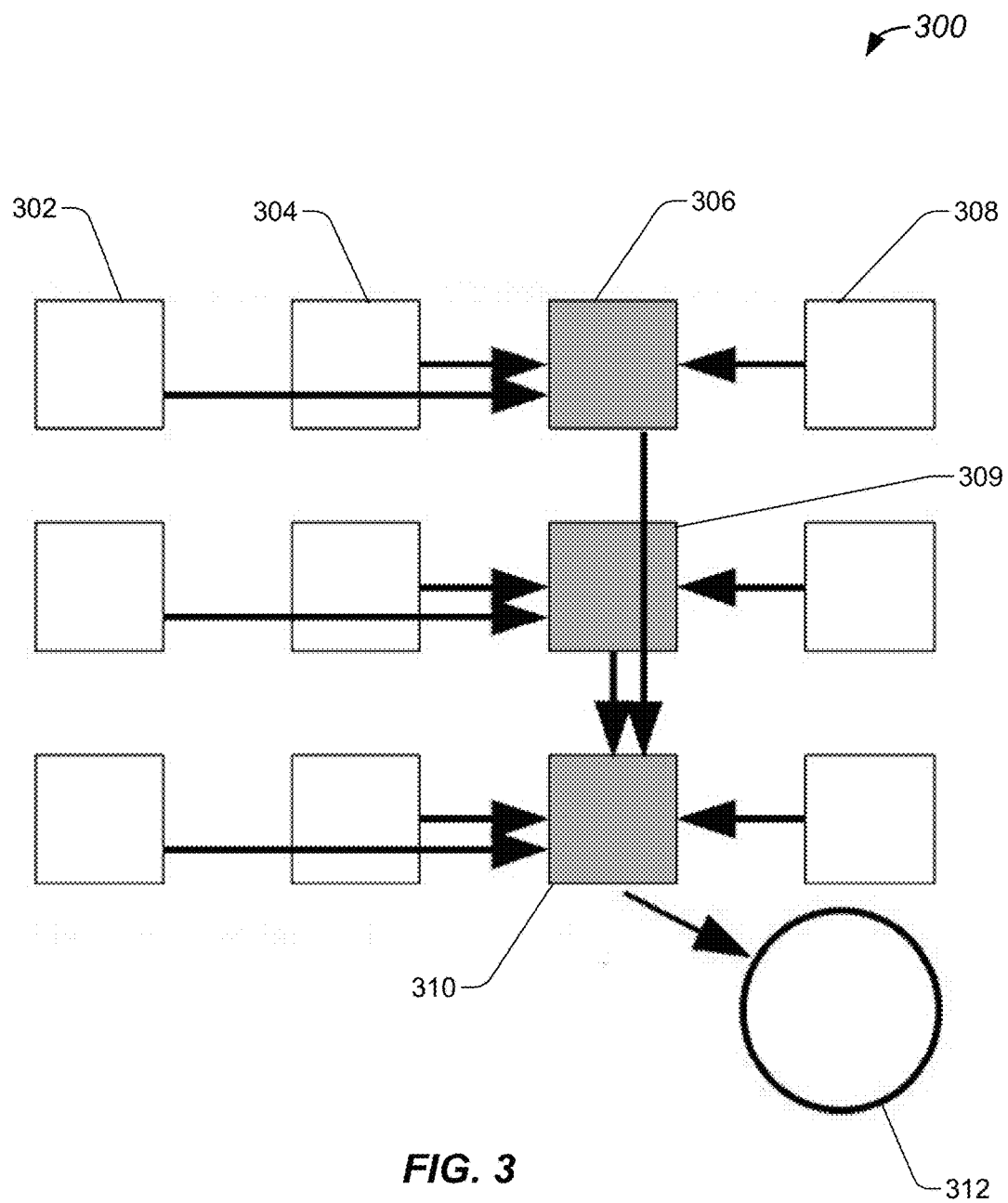
FIG. 3 illustrates an example of a CMS engine that may implement a read data transfer operation in accordance with some embodiments.

FIG. 3 illustrates an example of a CMS engine that may implement a read data transfer operation in accordance with some embodiments. As previously discussed above with reference to FIG. 2, the read data transfer operation may be a synchronous read operation. In a synchronous read operation, a CMS engine may initiate a read operation when all of the processor cores of a plurality of processor cores of a multiple-core processor are ready to receive data. As a read data transfer operation may start when a trigger packet is received by a CMS engine, in some embodiments, the trigger packet is received when all of the processor cores of the plurality of processor cores are ready to receive data.

As shown in FIG. 3, a row of processor cores included in a multiple-core processor may include a row of routers associated with each processor core. For example, an on-chip network may include router 302 which may be associated with a first processor core, router 304 which may be associated with a second processor core, router 306 which may be associated with a third processor core, and router 308 which may be associated with a fourth processor core where each of the first, second, third, and fourth processor cores are included in a single row of processor cores. In various embodiments, each of the routers may be configured to aggregate and transmit one or more data values associated with a processor core. For example, a router may be configured to generate a packet indicating that a processor core is ready to receive data. In this example, each of router 302, router 304, router 306, and router 308 may be configured to generate a packet indicating that its associated processor core is ready for a read data transfer operation.

In various embodiments, a hierarchy may be implemented among the routers to generate a single packet when all processor cores are ready for a read data transfer operation. Thus, routers for a single row of processor cores may transmit ready or trigger packets to a single router within the row. That single router may then generate a packet indicating that the entire row of processor cores is ready, and the router may send the generated packet to a higher row in the hierarchy. For example, ready packets generated by router 302, router 304, and router 308 and may be sent to router 306. When the processor core associated with router 306 is also ready, router 306 may send a ready packet to router 310. Similarly, when all processor cores in the row associated with router 309 are ready, router 309 may send a ready packet to router 310. When all processor cores in the row associated with router 310 are ready and router 310 has received ready packets from all other rows of processor cores, router 310 may generate a master ready packet and send the master ready packet to the CMS engine 312. In this way, the hierarchy between router 310 and the other rows of processor cores and their associated routers ensures a synchronous read data transfer operation in which a trigger or ready packet is sent to the CMS engine 312 when all processor cores are ready to receive data.

While various embodiments herein describe the use of a master ready packet, in some embodiments, each row of routers or each router within each row may individually send ready packets to the CMS engine 312. For example, router 306 may send a ready packet to the CMS engine 312, router 309 may also send another ready packet to the CMS engine 312, and router 310 may send yet another ready packet to the CMS engine 312. Accordingly, the CMS engine 312 may aggregate ready packets from each of the respective routers and initiate a data transfer operation when ready packets have been received from all routers. In another example, each router within each row, such as router 302, router 304, router 306, and router 308, may individually send ready packets to the CMS engine 312 which may then initiate a data transfer operation when ready packets have been received from all routers.

In various embodiments, for synchronous read data transfer operations, the CMS engine initiates reading from memory when all processor cores have made a CMS synchronous read function call for the same data array. Therefore, processor cores may utilize double buffering because they might not receive the next iteration's data array before completing their computation on the previous iteration's data array. However, processor cores may block and wait for other processor cores to become ready. Because barrier calls may be used at the beginning of computation loops, synchronous read function calls introduce no additional waiting and can replace barrier calls.

While FIG. 3 describes the use of system 300 for a synchronous read operation, as similarly discussed above with reference to FIG. 2, according to some embodiments, the read data transfer operation may be an asynchronous read operation. In an asynchronous read operation, a CMS engine may initiate a read operation when at least one processor core of a plurality of processor cores of a multiple-core processor is ready to receive data. As a read data transfer operation may start when a trigger packet is received by a CMS engine, in some embodiments, the trigger packet is received when at least one processor core of the plurality of processor cores is ready to receive data. For asynchronous read data transfer operations, the transfer may initiate when the first processor core makes a read function call. In these embodiments, non-ready processor cores may buffer the next iteration's data array. Therefore, processor cores may utilize triple buffering to receive data for the data array for the next computing iteration, while performing computations on the current iteration's data array as well as writing out the previous iteration's data array. To prevent buffer overflows, an asynchronous CMS read operation for the next data array might not be initiated by the CMS engine if the read operation for the previous data array is not yet complete. Furthermore, while various embodiments have been described with reference FIG. 3 that utilize read data transfer operations, according to some embodiments, a similar synchronous and/or asynchronous functionality may also be implemented for write data transfer operations.

Figure 4:
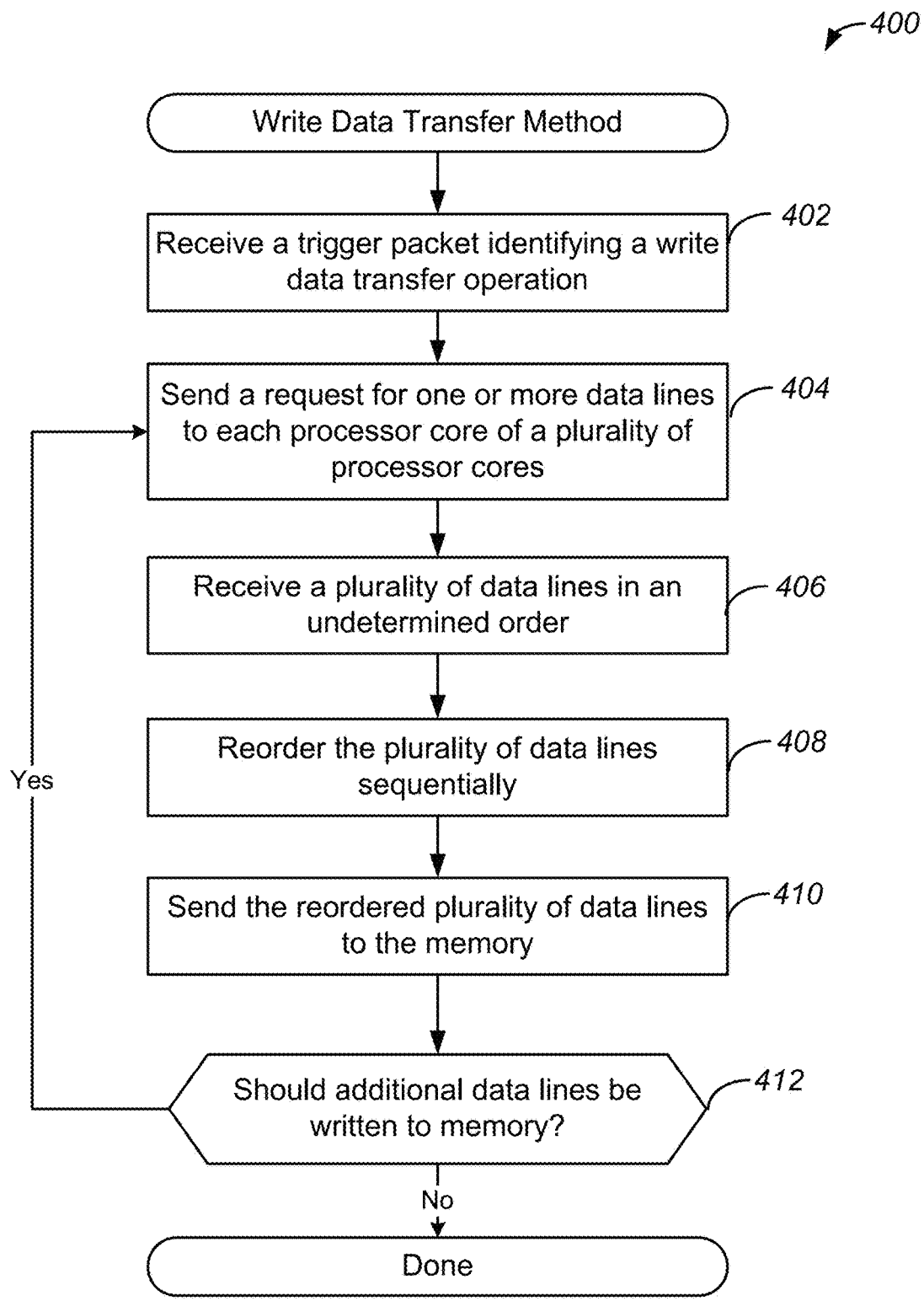
FIG. 4 shows an example of a flow diagram illustrating a method for writing data to a memory using a CMS engine implemented in accordance with some embodiments.

FIG. 4 shows an example of a flow diagram illustrating a method for writing data to a memory using a CMS engine implemented in accordance with some embodiments. The method 400 shown in FIG. 4 may be performed with the CMS engine 125 described above in FIG. 1. Accordingly, a CMS engine as disclosed herein may be used to read data from multiple processor cores of a multiple-core processor, and write the data to a data array stored in a memory. Starting at block 402 of the method 400, a trigger packet may be received. In some embodiments, the trigger packet is a data packet that initiates the write data transfer operation. According to various embodiments, the trigger packet includes information regarding the write data transfer operation. More specifically, according to some embodiments, the trigger packet includes information defining a start memory address or tile line and an end memory address or tile line of the memory for the write data transfer operation. Moreover, the trigger packet may include information indicating that at least one processor core of the plurality of processor cores is ready to write data. In some embodiments, the trigger packet may be received from and may identify the processor core that is mapped to or associated with a first tile line of the data array that is to be written. The trigger packet may also include further information about the write data transfer operation. For example, in some embodiments, the trigger packet includes a mapping of memory addresses or tile lines to each processor core of a plurality of processor cores of a multiple-core processor.

At block 404, a request for data lines may be sent to each processor core of a plurality of processor cores. In various embodiments, the processor cores that are sent requests may be identified based on a predetermined mapping between the data array stored in memory and the plurality of processor cores included in the multiple-core processor. As previously discussed, different memory tiles or lines may be associated with or assigned to different processor cores within the multiple-core processor based on a particular mapping scheme or mode which may have been previously declared, defined, or generated, as discussed in greater detail below with reference to FIG. 5, FIG. 6, and FIG. 7. Accordingly, in response to receiving, from a first processor core, a trigger packet associated with a particular data array stored in memory, the CMS engine may use the mapping scheme to identify all other processor cores that that include data tiles or lines in that particular data array. The CMS engine may subsequently send a request to each of the identified processor cores for the most current version of its associated data tile or line. In this way, the CMS engine may pull data lines from the identified processor cores to retrieve all data lines that will be written to the data array stored in memory.

In various embodiments, as discussed in greater detail below, the request for data lines may include multiple requests made to multiple different processor cores that may be associated with the different data tile lines. Accordingly the request for data lines may be implemented as several batches or groups of requests. For example, the CMS engine may issue a predetermined number of requests at a time. The predetermined number may be determined based on a size of the reorder buffer. Issuing requests in this way may ensure that the responses to the requests do not exceed the capacity of the reorder buffer.

In some embodiments, the requests for data lines are sent in memory address order. Accordingly, the CMS engine may send the requests to the identified processor cores in an order that is determined based on the sequential order of the data lines associated with the requests. For example, if a tile line 1 has a memory address 1 and is associated with processor 1 and a tile line 2 has a memory address 2 and is associated with processor 5, the CMS engine may send a request for tile line 1 to processor 1 and may subsequently send a request to processor 5 for tile line 2. In some embodiments, the plurality of processor cores of a multiple-core processor may include all of the processor cores of the multiple-core processor. In some embodiments, the plurality of processor cores of a multiple-core processor may include some of or a portion of the processor cores of the multiple-core processor. Moreover, if a processor core is not ready to provide the requested data lines, each of the processor cores may be configured to delay its response until it is ready to provide the requested data lines.

At block 406, a plurality of data lines may be received in an undetermined order. In some embodiments, the plurality of data lines includes at least some of the requested data lines. The received data lines may be provided by the processor cores as a response to outstanding requests made by the CMS engine. Thus, the received data lines may be provided by the plurality of identified processor cores in response to the CMS engine issuing the requests at block 404. Accordingly, the CMS engine may issue a batch or group of requests, such as requests which may be sent during block 404, for a certain number of data lines which may be configurable and may be determined based on the size or capacity of the reorder buffer. According to various embodiments, the responses to a batch or group of requests for a number or range of data lines may be received in an undetermined order. In this way, the responses may be received in a random order within a particular range of requested data lines. In some embodiments, the data lines are received in an undetermined order because the processor cores may take different amounts of time to process the requests and/or differences in network latencies may cause differences among when the responses to the requests are received at the CMS engine. Thus, the data lines may be received in a random order even when the requests for data lines that were sent during block 404 are sent in memory address order.

At block 408, the plurality of data lines may be reordered sequentially. Thus, according to some embodiments, a reorder buffer included in the CMS engine may order the data lines received at block 406 such that they are written to the memory in sequential order. For example, the reorder buffer may reorder the received data lines from a start memory address to an end memory address based on an order of the data lines in the data array that is to be written. As previously discussed above with reference to the reorder buffer 135 of FIG. 1, the reorder buffer may include a logic device that detects addresses of incoming data lines and determines the order the data lines should be in. The reorder buffer may reorder the data lines and generate an ordered queue to be used in a subsequent write operation. For example, replies to requests for data lines may be enqueued in slots of the reorder buffer to preserve memory address order. The replies may be sent to a memory controller if there is no read reply for a lower address, and subsequently written to memory. The number of outstanding read requests may be bounded by the number of free slots in the reorder buffer. In some embodiments, the reorder buffer may include enough slots to eliminate memory idle cycles. The number of slots may be determined based on a system size, as well as a network and memory throughput.

At block 410, the reordered plurality of data lines may be sent to a memory. Accordingly, the CMS engine may write the data lines to the memory based on the order generated by the reorder buffer. In some embodiments, the sequential ordering of the data lines enables the writing of the data to the memory more quickly and more efficiently due to efficient use of row activations and minimization of an associated overfetch penalty.

While blocks 404, 406, 408, and 410 are shown as occurring sequentially, in some embodiments, operations at block 404, 406, 408, and 410 occur simultaneously. For example, a CMS engine may be sending requests for data lines to processor cores, receiving data lines, reordering data lines, and sending data lines to a memory at the same time.

In some embodiments, all data associated with the write data transfer operation may be read and sent/written during blocks 404 through 410. However, according to some embodiments, not all of the requests for data lines for a write data transfer operation are sent to all of the processor cores at once. As previously discussed, requests for data lines issued by the CMS engine to the processor cores may be issued in groups or batches. Thus, the request(s) issued at block 404 may be for a group or batch of data lines included in a distributed data array, and numerous groups or batches of requests may implemented to read all data that is to be written from the processor cores to the memory, which may be all the data associated with the write data transfer operation. For example, the size of the request or number of data lines requested at block 404 may be scaled based on a size of the reorder buffer such that the reorder buffer is able to store all of the requested data lines. Accordingly, at block 412, it may be determined whether or not additional data lines should be written to memory. If it is determined that additional data lines should be written to memory, method 400 may return to block 404 and blocks 404, 406, 408, and 410 may be repeated until all of the data lines associated with the write data transfer operation have been written to memory. If it is determined that no additional data lines should be written to memory, method 400 may terminate.

While the method 400 describes requests made to processors associated with a write operation for a data array, in some embodiments, requests may be made and handled for numerous different write operations simultaneously. For example, for an array including 512×512 elements, requests for six different write operations may be handled simultaneously. In this way, the CMS engine may be constantly writing data lines to memory.

Figure 5:
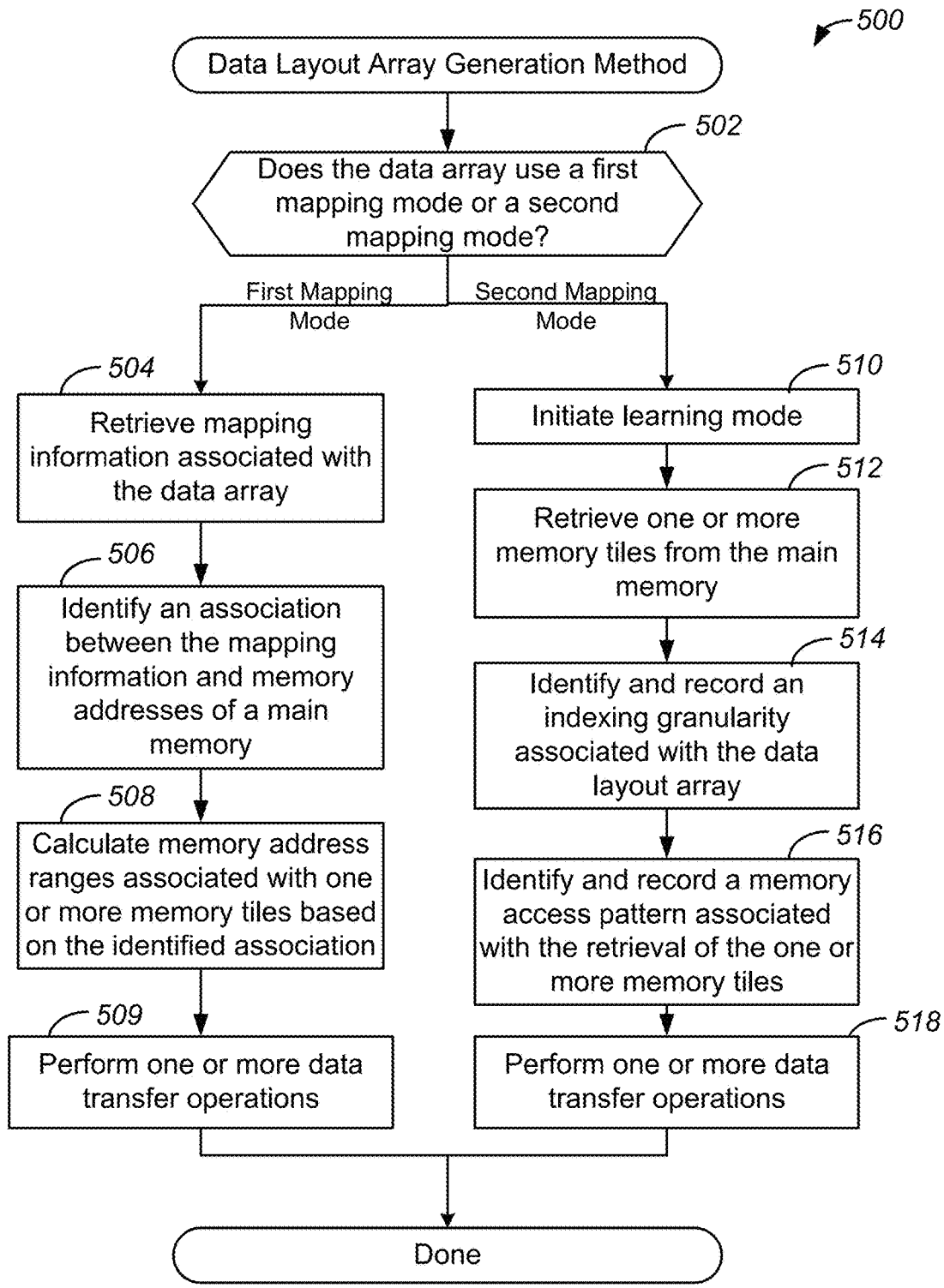
FIG. 5 illustrates a flow chart of an example of a method for generating a data layout array, implemented in accordance with some embodiments.

FIG. 5 illustrates a flow chart of an example of a method for generating a data layout array, implemented in accordance with some embodiments. As previously discussed, a control unit, such as a CMS engine, may utilize a mapping between processor cores and addresses or locations within a data array to facilitate the collective management of data transfers between the processor cores and the main memory.

In some embodiments, the CMS engine may be capable of implementing multiple different mapping modes. For example, the CMS engine may implement a first mapping mode in which a data array is partitioned into tiles, and the tiles are mapped to processor cores. Moreover, the CMS engine may implement a second mapping mode which may be more flexible than the first mapping mode and may support any layout of memory addresses to processors or processor cores. Thus the second mapping mode may map locations in memory to processors at an increased level of granularity which may be, for example, a single line of a memory tile. Accordingly, the generation of a data layout array used with such mapping schemes may depend on what type of mapping mode is implemented. In various embodiments, the implementation of a mapping mode may depend upon a system configuration or declaration previously determined by a user or programmer.

Accordingly, at block 502, it may be determined whether or not the data array uses a first mapping mode or a second mapping mode. As previously discussed, such a determination may be made based on one or more data values identifying a previously defined configuration or declaration. In some embodiments, the one or more data values may be included in a trigger packet. Thus, a control unit, such as a CMS engine, may identify or determine a mapping mode based on one or more data values included in the trigger packet. If it is determined that the data array uses the first mapping mode, the method 500 may proceed to block 504.

At block 504, mapping information associated with the data array may be retrieved. In various embodiments, the mapping information may be included in an HTA declaration which, as discussed in greater detail below with reference to FIG. 7, may include one or more parameters which define the boundaries of tiles within a data array, as well as one or more parameters defining a mapping function associated with the data array. In some embodiments, the mapping function may identify a particular processor core that is mapped or associated with which a particular memory tile. For example, the function may arbitrarily assign numbers to tiles as well as processor cores, and may map them to each other. In this example, a first memory tile may be mapped to a first processor core, and a second memory tile may be mapped to a second processor core. In various embodiments, such mapping associations may be stored in a mapping matrix. The associations and mapping matrices may have been previously determined or configured by a user, programmer, or system component when the system, such as system 100, was initially configured. As previously discussed, the mapping information may be provided as part of an HTA declaration which may include one or more parameters defining a mapping function or matrix. In various embodiments, the mapping information may be retrieved from one or more data values previously stored in a data store during such an initial configuration. In some embodiments, the mapping information may be retrieved from a trigger packet received from a processor core, as discussed above with reference to FIG. 2 and FIG. 4. Furthermore, in some embodiments, the mapping information may also include one or more parameters denoting a number of elements, cells, or units of a tile that are shared with neighboring tiles.

At block 506, an association between the mapping information and memory addresses of a main memory may be identified. In various embodiments, a system component, such as a CMS engine, may identify an association between the mapping information and the memory addresses based on a known mapping of the data array to the main memory. For example, each tile may have a predetermined size or address range within the data array, as may be determined based on an initial declaration or configuration of the system. Moreover, the CMS engine may have a starting address associated with the data array which may have been retrieved from, for example, a trigger packet or ready packet. Based on this information, the CMS engine may associate memory tiles with memory addresses of the main memory.

Accordingly, at block 508, memory address ranges associated with the one or more memory tiles may be calculated based on the identified association. Thus, the CMS engine may calculate and store address ranges for each memory tile, and each processor core associated with each memory tile. In this way, the CMS engine may perform one or more calculations that map each processor core to a memory address range representative of a memory tile within the data array.

At block 509, the calculated memory address ranges may be used in subsequent read data transfer operations and/or write data transfer operations, as discussed above with reference to FIG. 2 and FIG. 4. Accordingly, the collective data transfers may be made between the processor cores and the memory based on the memory address ranges that were calculated and mapped by the CMS engine.

Returning to block 502, if it is determined that the second mapping mode is used, then at block 510, a learning mode or period may be initiated. In some embodiments, the learning mode or period may enable a system component, such as a CMS engine, to observe a memory access pattern that occurs when the processor cores included in the multiple-core processor retrieve tiles or tile lines from the main memory without coordination. Accordingly, instead of obtaining mapping information from a predetermined source, such as HTA declarations, the CMS engine may determine the mapping information based on observed memory access activity, and such additional HTA parameters might not be used in the HTA declarations. Thus, during the learning period, the CMS engine does not coordinate data transfers, but instead acts as a passive observer, as will be discussed in greater detail below. In various embodiments, the learning period may be initiated by a flag included in a trigger packet. For example, a ready packet may be sent by a processor core. The ready packet may include a flag including one or more data values indicating that a new data structure is being processed and a learning period should be initiated.

At block 512, one or more memory tiles may be retrieved from the main memory. Thus, during the learning period, the individual processor cores may manage and handle their own respective memory access requests for tiles with the data array. Accordingly, one or more of the processor cores may issue a read access request to the main memory to fetch its associated memory tile. During block 512, each of the processor cores may also explicitly mark which read access requests are made for shared data as well as which read access requests are made for owned data.

At block 514, the indexing granularity associated with a data layout array may be identified and recorded. In some embodiments, the CMS engine may maintain a dedicated data layout array in which it records and stores mapping information associated with the processor cores and the data array. The data layout array may be indexed at a granularity defined by the largest contiguous address range that is associated with a single processor. As discussed in greater detail below with reference to FIG. 6, an example of such a level of granularity may be a single line of a memory tile within a data array. In various embodiments, the indexing granularity of the data layout array is determined based on the size of the memory access requests issued during block 512. Thus, the CMS engine may determine the indexing granularity of the data layout array based on the largest address range that was included in a memory access request issued during block 512.

At block 516, a memory access pattern associated with the retrieval of the one or more memory tiles may be identified and recorded. In various embodiments, the CMS engine may record which processor core has requested access to which location in memory. Returning to a previous example, if the data layout array has been formed at a tile line level of granularity, the CMS engine may store and record which processor core is associated with each line of each memory tile to create a mapping matrix which associates the processor cores with the data array. The mapping information may be used in subsequent read data transfer operations and write data transfer operations. In various embodiments, a similar array may also be created for shared data. As previously discussed, requests for shared data may be explicitly marked. Accordingly, the CMS engine may populate a data layout array that identifies which processor cores share which tile lines. In this way, the CMS engine may store mapping information in two data layout arrays; a first data layout array that maps units of memory tiles to owner processor cores, and a second data layout array that maps units of memory tiles to shared processor cores.

At block 518, one or more data transfer operations may be performed. Thus, a read operation, as discussed above with reference to FIG. 2, and/or a write operation, as discussed above with reference to FIG. 4, may be performed using the mapping information that was determined during block 510, 512, 514, and 516. Accordingly, collective data transfers may be made between the processor cores and the memory based on a mapping between the processor cores and the memory that was determined by the CMS engine.

Figure 6:
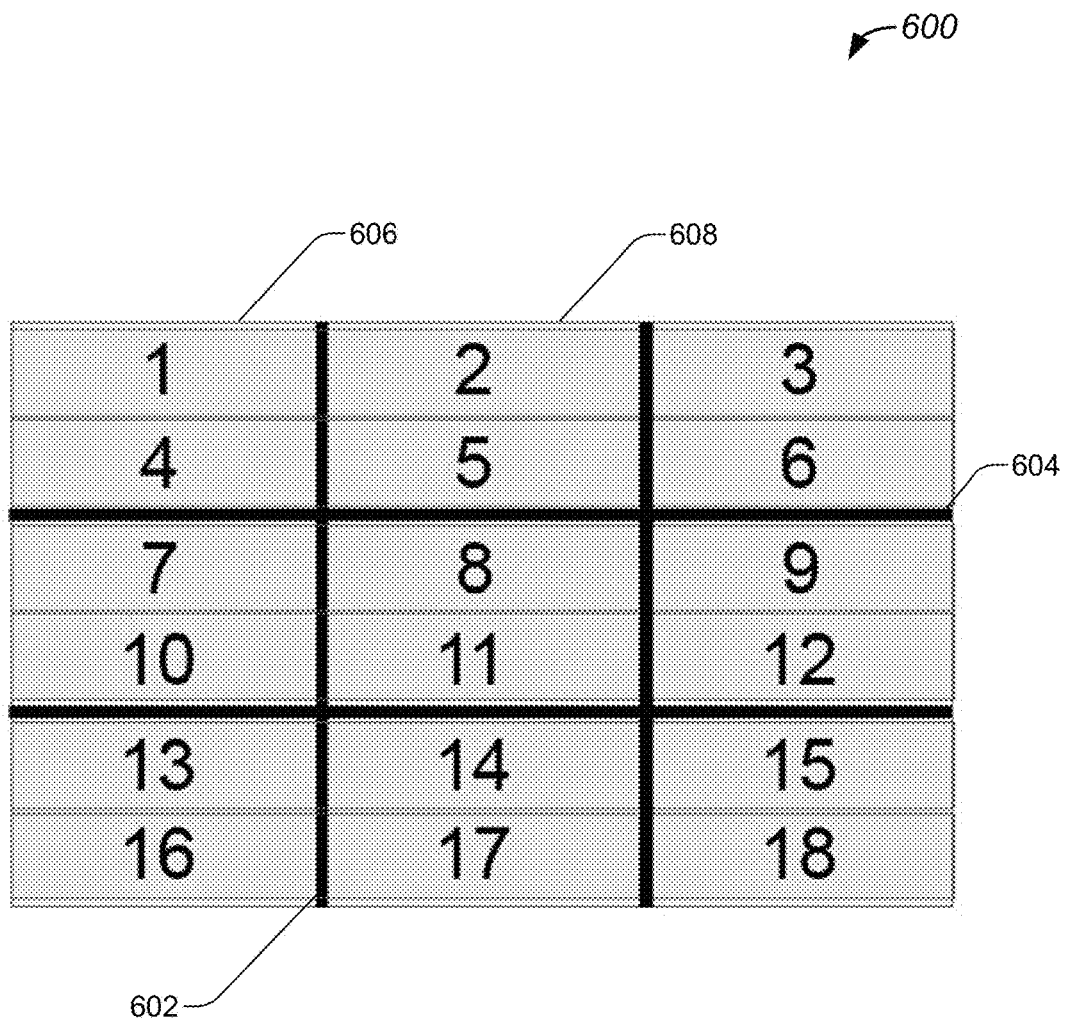
FIG. 6 illustrates an example of a data layout array generated in accordance with some embodiments.

FIG. 6 illustrates an example of a data layout array generated in accordance with some embodiments. As previously discussed above with reference to FIG. 5, a data layout array may be generated using a mapping method that is flexible and enables the use of varying levels of granularity. Thus, a data array may be mapped to processor cores not just at the tile level, but at any level of granularity with respect to the data array and its individual tiles. Accordingly, if desired, declarations of memory tiles may be retained, but specific datum or units of data within each memory tile may be mapped to processor cores separately.

For example, as shown in the data layout array 600, a data array may be partitioned into memory tiles by boundaries established by HTA declarations, such as the boundary 602 and the boundary 604. Moreover, the data array may have memory tiles, such as a first memory tile associated with the tile 606 and a second memory tile associated with the tile 608. However, the data layout array 600 may be mapped to processor cores more precisely and at a higher level of granularity than just the tile level. As shown in the data layout array 600, the largest address range assigned to a single processor core may provide the basis for indexing the data layout array 600. In this example, the largest address range may be a single line of a memory tile. Accordingly, each memory tile line may be mapped to a processor core. An example of a mapping of tile lines to processor cores is discussed in greater detail below with reference to Table 1.

TABLE 1

|  | Tile line | | | | | |
| --- | --- | --- | --- | --- | --- | --- |
|  | 1 | 2 | 3 | 4 | . . . | 18 |
| Processor | 1, 1 | 1, 2 | 1, 3 | 1, 1 | | 3, 3 |

Table 1 illustrates an example of a mapping of tile lines to a 3×3 processor core array. In this example, the processors or processor cores may be arranged in a 3×3 array and identified based on row- or column-major mapping. Accordingly, tile line 1 may be mapped to a first processor residing at a position [1,1] within the array of processors. Moreover, tile line 2 may be mapped to a second processor residing at a position [1,2], tile line 3 may be mapped to a third processor residing at a position [1,3], tile line 4 may be mapped to the first processor residing at a position [1,1], and so on. In this way, each tile line of the data array may be mapped to a processor or processor core. While the example described in FIG. 6 illustrates tile lines within a single memory tile being mapped to the same processor core (for example, tile lines 1 and 4 being mapped to a first processor core), in some embodiments, tile lines within the same memory tile may be mapped to different processor cores. The mapping information included in Table 1 may be stored as part of or in a separate data array as data layout array 600.

Figure 7:
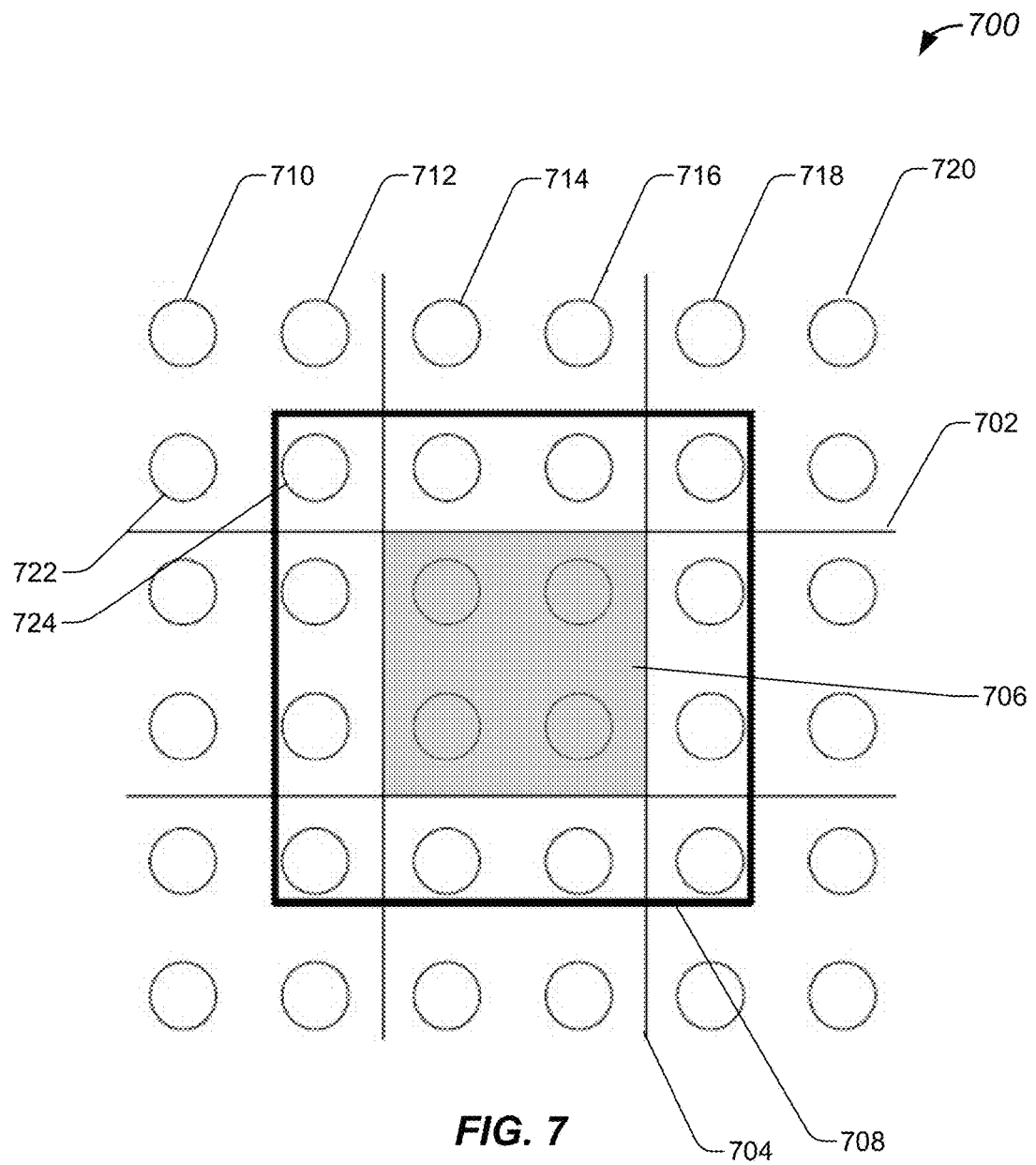
FIG. 7 illustrates an example of a mapping generated based on a hierarchically tiled array (HTA) declaration, implemented in accordance with some embodiments.

FIG. 7 illustrates an example of a mapping generated based on a hierarchically tiled array (HTA) declaration, implemented in accordance with some embodiments. Thus, the data array 700 may represent an array of data stored in a main memory. As similarly discussed above, the data array 700 may be partitioned into memory tiles delineated by boundaries, such as boundary 702 and boundary 704, which may be defined by the HTA declaration itself. In various embodiments, the data array 700 may include the memory tile 706 which may be defined by the HTA declaration. Moreover, the memory tile 706 may have associated shared data. In this example, the shared data has also been defined by the HTA declaration as extending one element in a dimension. Thus, the boundary of the shared data is shown in FIG. 7 as boundary 708 which encompasses one element or datum in each direction or dimension from the memory tile 706.

As similarly discussed above with reference to FIG. 5, the data included in the data array 700 may be mapped to one or more processors or processor cores based on a mapping mode or scheme. Thus, each datum or unit or data, such as datum 710 may be mapped to a processor core and associated with that processor core for subsequent read data transfer operations and write data transfer operations. For example, if a processor that is associated with the first datum of the data array 700, which may be datum 710, is ready to write data to the data array 700, the processor may send a control or trigger packet to the CMS engine associated with the data array 700. The CMS engine may then send read requests, which may be for entire tile lines, to retrieve the data array from the processor cores in memory address order. As previously discussed, the requests may be sent in groups or batches of requests. In some embodiments, the size of a group or batch and a number of requests made at a single time may be determined based on a size of the reorder buffer. In this example, a first read request for datum 710 and datum 712 may be served by a first processor 1, a second read request for datum 714 and datum 716 may be served by a second processor, a third read request for datum 718 and datum 720 may be served by a third processor, a fourth read request for datum 722 and datum 724 may be served by the first processor, and likewise for the rest of the group or batch of requests, and for the rest of the data array 700.

Figure 8:
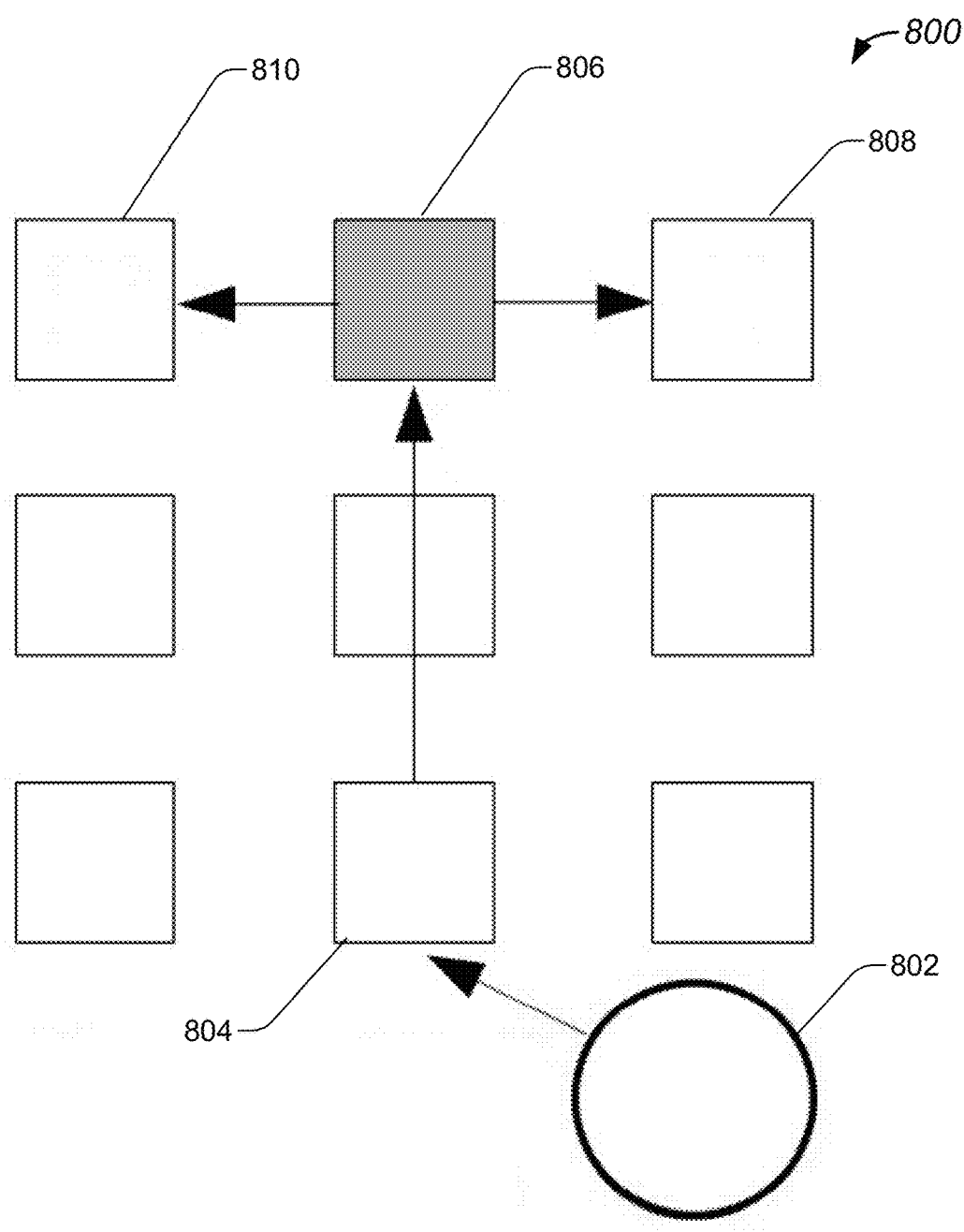
FIG. 8 illustrates an example of a CMS engine that may multicast a packet, implemented in accordance with some embodiments.

FIG. 8 illustrates an example of a CMS engine that may multicast a packet, implemented in accordance with some embodiments. As similarly discussed above with reference to FIG. 2 and FIG. 3, shared data may be sent to numerous different processor cores within a multiple-core processor 800. For example, when data is being sent from the CMS engine 802 to processor cores, as may be done during a read data transfer operation, shared data included in ghost zones may be sent to reader processor cores as well as the owner processor core. Accordingly, a packet including the shared data may be multicast within the network of processor cores to reduce the energy cost of the packet that is being sent to multiple different processor cores.

As shown in FIG. 8, the CMS engine 802 may send a multicast packet to a first router 804, which may forward the packet to the appropriate row of processor cores which may be identified based on one or more data values included in the packet. Accordingly, the packet may be forwarded to router 806. In some embodiments, a processor core associated with router 808 may be the owner of the packet and a processor core associated with router 810 may be a reader of shared data included in the packet. Accordingly, router 806 may receive the packet and may be configured to generate a separate packet for transmission to the reader processor core associated with router 810. The generated packet may include the shared data. The original packet may be forwarded to router 808 and the associated owner processor core.

In this way, the network router that is present where the paths to the owner and reader processor cores diverge may be configured to generate a copy of the packet with only the ghost zone data for transmission to the reader processor core, while the original packet continues to the owner processor core. Accordingly, while FIG. 8 illustrates the duplication of the packet when the packet reaches the first router in the destination router's row, such duplication may occur or be performed by any appropriate router, which may be in another or different row or may be further along the communication path within a row. For example, if the path to the owner processor core is first router-second router-third router-fourth router-fifth router and the path to the reader processor core is first router-second router-sixth router-seventh router, the packet may be duplicated at the last common router, which may be the second router. In this example, the second router might not be the first router the packet reaches in the owner's row, but might instead be in a different row or might be the second router within the owner's row.

Multicasting the packet in this way reduces propagation energy and contention in the network because only one packet traverses the common path between the CMS engine 802 and the destination processors, instead of two separate packets. In some embodiments, implementations of multicast in on-chip routers may extend cycle time by 1%, area by 5%, and power by 2%. The 2% power increase is easily offset by the energy savings due to fewer bits propagating, especially in networks that consume most of their power in channels.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A device comprising:
a control unit, the control unit being configured to coordinate a transfer of data between a memory and a plurality of processor cores of a multiple core processor, the memory being configured to store a hierarchically tiled data array, the control unit being configured to:
  (a) receive, from at least one of the plurality of processor cores, a trigger packet associated with a read data transfer operation, the trigger packet including one or more data values identifying a request for the read data transfer operation and identifying a memory tile of a plurality of memory tiles included in the hierarchically tiled data array, wherein boundaries of the memory tiles are defined using hierarchically tiled array (HTA) declarations;
  (b) identify a first plurality of data lines associated with the read data transfer operation based on the one or more data values included in the trigger packet, and identify a processor core for each of the first plurality of data lines based on a processor core mapping that maps each of the first plurality of data lines to at least one of the plurality of processor cores, the processor core mapping being generated by the control unit based on observed memory access patterns between the plurality of processor cores and the plurality of memory tiles, the processor core mapping being generated using HTA syntax to define a two dimensional plane of data associated with the control unit;
  (c) read the first plurality of data lines from the memory sequentially; and
  (d) send the first plurality of data lines to the at least some of the plurality of processor cores based, at least in part, on the processor core mapping.

2. The device of claim 1, wherein the one or more data values included in the trigger packet define a mapping of a plurality of memory address ranges of the memory to the plurality of processor cores.

3. The device of claim 2, wherein each memory address range of the plurality of memory address ranges corresponds to a memory tile of a plurality of memory tiles included in a tiled data array.

4. The device of claim 3, wherein in operation (d), data lines of the first plurality of data lines are sent to processor cores of the plurality of processor cores based on the mapping, and wherein the mapping associates each memory tile of the plurality of memory tiles with a processor core of the plurality of processor cores.

5. The device of claim 1, wherein the control unit is configured to generate a mapping between a plurality of memory address ranges and the plurality of processor cores in response to receiving the trigger packet.

6. The device of claim 5, wherein the one or more data values included in the trigger packet include a flag, wherein the control unit is configured to initiate a learning mode in response to identifying the flag, and wherein the control unit is further configured to store the mapping in a data layout array.

7. The device of claim 6, wherein the control unit is configured to observe memory access patterns associated with the plurality of processor cores when in the learning mode.

8. The device of claim 1, wherein operations (c) and (d) occur at least in part at the same time.

9. The device of claim 1, wherein the control unit is configured to perform operation (c) in response to all of the processor cores of the plurality of processor cores being ready to receive data.

10. The device of claim 1, wherein the control unit is configured to perform operation (c) in response to at least one of the processor cores of the plurality of processor cores being ready to receive data.

11. The device of claim 1, wherein the memory is a storage device selected from the group consisting of: a random access memory, a direct random access memory, and a non-volatile random-access memory.

12. A device comprising:
a control unit, the control unit being configured to coordinate a transfer of data between a memory and a plurality of processor cores of a multiple core processor, the memory being configured to store a hierarchically tiled data array comprising a plurality of memory tiles having boundaries defined using hierarchically tiled array (HTA) declarations, the control unit being configured to:
  (a) receive, from at least one of the plurality of processor cores, a trigger packet associated with a write data transfer operation, the trigger packet including one or more data values identifying a request for the write data transfer operation;
  (b) send a request for at least one data line to at least some of the processor cores of the plurality of processor cores, the at least some of the processor cores being identified based on a processor core mapping that maps the at least one data line to at least one of the plurality of processor cores, the processor core mapping being generated by the control unit based on observed memory access patterns between the plurality of processor cores and the plurality of memory tiles, the processor core mapping being generated using HTA syntax to define a two dimensional plane of data associated with the control unit;
  (c) receive, from at least one of the processor cores, a plurality of data lines, the plurality of data lines including at least a portion of the requested at least one data line;
  (d) reorder the plurality of data lines sequentially based on one or more memory addresses associated with each data line of the plurality of data lines to generate a reordered plurality of data lines; and
  (e) write the reordered plurality of data lines to the memory.

13. The device of claim 12, wherein the one or more data values included in the trigger packet define a mapping of a plurality of memory address ranges of the memory to the plurality of processor cores.

14. The device of claim 13, wherein each memory address range of the plurality of memory address ranges corresponds to a memory tile of a plurality of memory tiles included in a tiled data array, wherein the mapping associates each memory tile of the plurality of memory tiles with a processor core of the plurality of processor cores, and wherein in operation (e), data lines of the reordered plurality of data lines are written to the memory based on the mapping between the plurality of memory tiles and the plurality of processor cores.

15. The device of claim 12, wherein the control unit is configured to generate a mapping between a plurality of memory address ranges and the plurality of processor cores in response to receiving the trigger packet.

16. The device of claim 12, wherein the trigger packet includes one or more data values indicating that at least one processor core of the plurality of processor cores is ready to write data.

17. The device of claim 12, further comprising a reorder buffer configured to perform operation (d).

18. The device of claim 12, wherein in operation (c), data lines of the plurality of data lines are received in a random order.

19. A system comprising:
a memory configured to store one or more data values included in a hierarchically tiled data array comprising a plurality of memory tiles having boundaries defined using hierarchically tiled array (HTA) declarations;
a memory controller configured to manage reading and writing data to and from the memory;
a plurality of processor cores of a multiple core processor configured to perform one or more processing operations on at least some of the one or more data values stored in the memory, the plurality of processor cores being configured to issue read data transfer requests to read at least some of the data values stored in the memory, and the plurality of processor cores being further configured to issue write data transfer requests to write to the memory; and
a control unit configured to coordinate the read data transfer requests sent from the plurality of processor cores to the memory, and further configured to coordinate the write data transfer requests sent from the plurality of processor cores to the memory, wherein the plurality of processor cores are identified based on a processor core mapping that maps each of a plurality of data lines to at least one of the plurality of processor cores, the processor core mapping being generated by the control unit based on observed memory access patterns between the plurality of processor cores and the plurality of memory tiles, the processor core mapping being generated using HTA syntax to define a two dimensional plane of data associated with the control unit.

20. The system of claim 19, wherein the control unit is integrated with the memory controller.

* * * * *